United States Patent
Max et al.

(10) Patent No.: US 9,822,666 B2
(45) Date of Patent: Nov. 21, 2017

(54) QUAD-TAB U-WASHER

(71) Applicant: United Technologies Corporation, Hartford, CT (US)

(72) Inventors: Seth A. Max, Prospect, CT (US); Steven D. Porter, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 291 days.

(21) Appl. No.: 14/679,291

(22) Filed: Apr. 6, 2015

(65) Prior Publication Data

US 2016/0290166 A1    Oct. 6, 2016

(51) Int. Cl.

| | |
|---|---|
| *F01D 25/00* | (2006.01) |
| *F01D 25/24* | (2006.01) |
| *F01D 25/12* | (2006.01) |
| *F01D 25/16* | (2006.01) |
| *F16B 43/00* | (2006.01) |
| *F16B 39/24* | (2006.01) |
| *F16B 39/10* | (2006.01) |
| *F01D 9/00* | (2006.01) |
| *F01D 9/02* | (2006.01) |

(52) U.S. Cl.
CPC ......... *F01D 25/243* (2013.01); *F01D 25/125* (2013.01); *F01D 25/162* (2013.01); *F01D 25/246* (2013.01); *F16B 39/101* (2013.01); *F01D 9/00* (2013.01); *F01D 9/02* (2013.01); *F01D 25/00* (2013.01); *F05D 2220/32* (2013.01); *F05D 2250/75* (2013.01); *F05D 2260/31* (2013.01); *F16B 39/108* (2013.01); *F16B 39/24* (2013.01); *F16B 43/00* (2013.01)

(58) Field of Classification Search
CPC .... F01D 25/243; F01D 25/246; F01D 25/162; F01D 25/125; F01D 25/00; F01D 9/00; F01D 9/02; F05D 2260/31; F16B 43/00; F16B 39/00; F16B 39/108; F16B 39/101; F16B 39/24
USPC .......................................... 411/102, 122, 123
See application file for complete search history.

(56) References Cited

U.S. PATENT DOCUMENTS

| | | | |
|---|---|---|---|
| 3,713,686 A | 1/1973 | Eddy et al. | |
| 5,755,824 A * | 5/1998 | Blechschmidt | F16B 33/008 470/163 |
| 6,439,616 B1 | 8/2002 | Karafillis et al. | |
| 7,708,509 B1 * | 5/2010 | Bennett | F16B 39/108 411/119 |
| 2011/0030499 A1 * | 2/2011 | Benda | F16M 11/10 74/502.4 |

(Continued)

OTHER PUBLICATIONS

Extended European Search Report for EP Application No. 16163970.3, dated Oct. 6, 2016, 8 pages.

*Primary Examiner* — Woody Lee, Jr.
*Assistant Examiner* — Behnoush Haghighian
(74) *Attorney, Agent, or Firm* — Kinney & Lange, P.A.

(57) ABSTRACT

A washer includes a first lobe comprising a first hole, a second lobe comprising a second hole, a third lobe comprising a third hole, and a fourth lobe comprising a fourth hole. A first leg extends from the first lobe to the second lobe, and a second leg extends between the third lobe and the fourth lobe, wherein the second leg is parallel to the first leg. A third leg extends from the first lobe to the third lobe and spaces the first leg from the second leg such that the second lobe is disposed opposite the fourth lobe.

18 Claims, 7 Drawing Sheets

(56) References Cited

U.S. PATENT DOCUMENTS

2014/0013770 A1* 1/2014 Farah .................. F01D 25/16
    60/796
2015/0192167 A1* 7/2015 Harris ................. F16B 39/101
    29/505

* cited by examiner

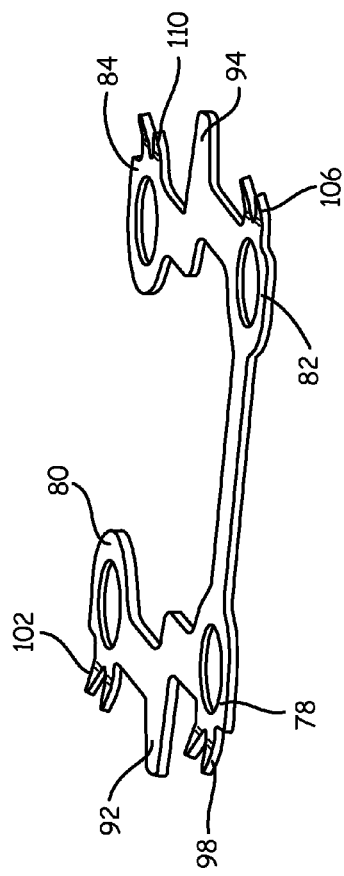
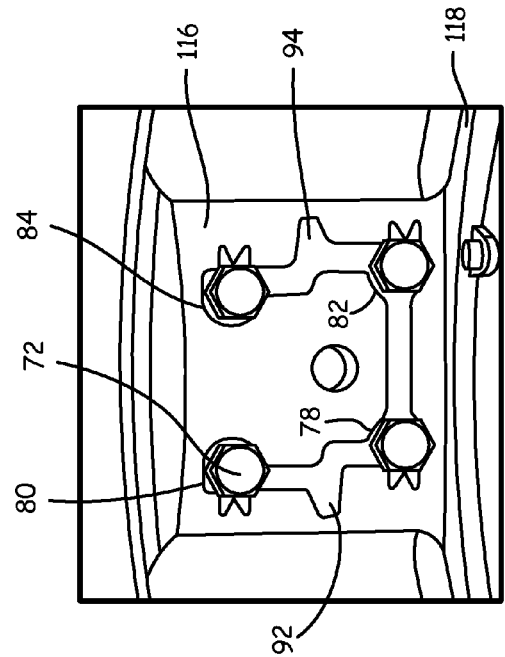
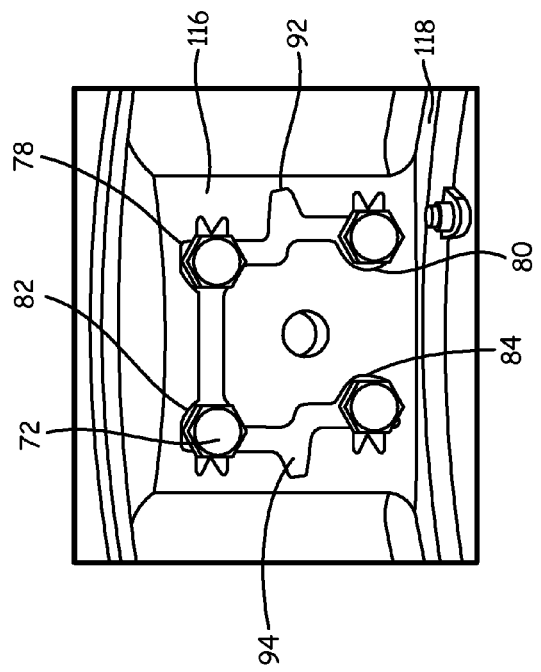

QUAD-TAB U-WASHER

BACKGROUND

The application relates generally to gas turbine engines, and more particularly, to engine case structures, such as mid turbine frame assemblies and similar structures.

A mid turbine frame (MTF) assembly, sometimes referred to as an interturbine frame, is located generally between a high turbine stage and a low pressure turbine stage of a gas turbine engine to support one or more bearings and to transfer bearing loads through to an outer engine case. The MTF assembly typically includes an inner case disposed around a rotor shaft of the gas turbine engine and the bearings supporting the rotor shaft. An outer case is disposed around the inner case to form a flowpath between the inner case and the outer case. Struts extend across the flowpath to connect the inner case to the outer case and to form a load path between the inner case and the outer case. The MTF assembly is thus a load bearing structure, and the safety of load transfer is one concern when a MTF assembly is designed.

In the past, some MTF assemblies have been formed by integrally forming the struts and inner case through a common casting and bolting the outer casing to the struts. In other previous MTF assembly designs, the struts have been mechanically connected to both the inner case and the outer case. In the MTF assembly designs where the struts are mechanically connected to both the inner case and the outer case, slots and grooves have been formed in both the outer case and the inner case to help prevent the struts and the mechanical connections of the struts from moving and coming loose. However, forming grooves and slots in the inner case and the outer case can create stress risers in the inner case and the outer case that can reduce the service life the MTF assembly. Accordingly, there is a need to provide improvements over previous MTF assemblies.

SUMMARY

In one aspect of the invention, a washer includes a first lobe comprising a first hole, a second lobe comprising a second hole, a third lobe comprising a third hole, and a fourth lobe comprising a fourth hole. A first leg extends from the first lobe to the second lobe, and a second leg extends between the third lobe and the fourth lobe, wherein the second leg is parallel to the first leg. A third leg extends from the first lobe to the third lobe and spaces the first leg from the second leg such that the second lobe is disposed opposite the fourth lobe.

In another aspect of the invention, a mid turbine frame includes an outer case, an inner case disposed radially within the outer case, and a strut extending radially between the outer case and the inner case. The strut includes a first end connected to the outer case and a second end forming a foot disposed against an outer surface of the inner case. The mid turbine frame further includes a washer disposed on an inner surface of the inner case opposite the foot of the strut. The washer includes a first lobe comprising a first hole and a second lobe comprising a second hole. The washer further includes a leg extending from the first lobe to the second lobe. At least two tabs extend from the first lobe and at least two tabs extend from the second lobe in a same direction as the at least two tabs of the first lobe. A reference tab extends from the first leg between the first lobe and the second lobe and in the same direction as the at least two tabs of the first lobe.

Persons of ordinary skill in the art will recognize that other aspects and embodiments of the present invention are possible in view of the entirety of the present disclosure, including the accompanying figures.

BRIEF DESCRIPTION OF THE DRAWINGS

FIG. 5 is a perspective view of the washer of FIG. 3.

FIG. 6A is an elevation view of the washer from FIG. 5 orientated in a correct position for installation.

FIG. 6B is an elevation view of the washer from FIG. 5 orientated in another correct position for installation.

Figure 1:
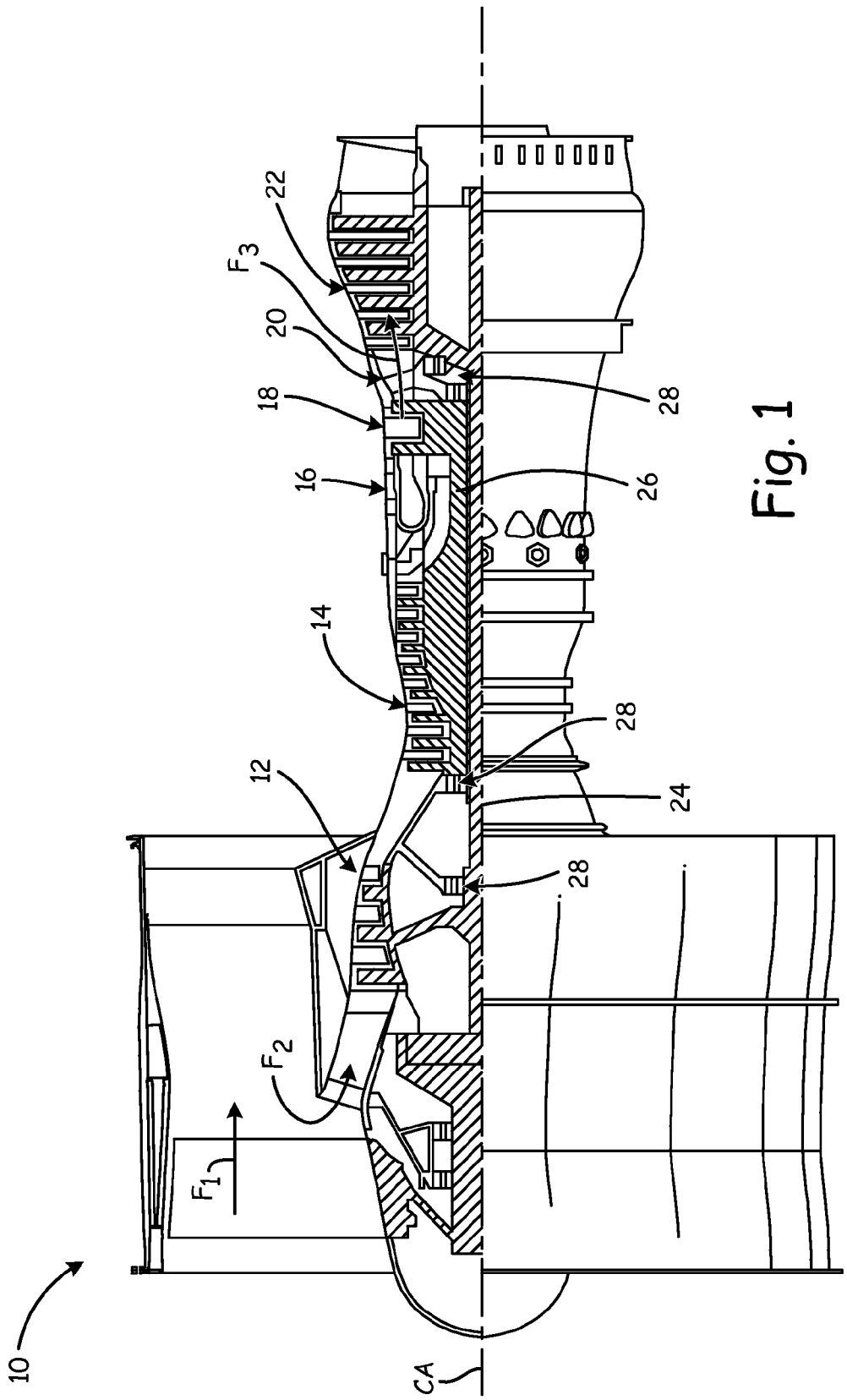
FIG. 1 is a partial sectional schematic view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a mid turbine case with an outer case, an inner case, and at least one strut connected between the inner case and the outer case. The strut includes a foot with four holes formed on an end that is connected to the inner case. Four corresponding holes are formed on the inner case and a single washer is disposed on an inner surface of the inner case opposite the foot. As described below with reference to the Figures, the washer also includes four holes and four sets of anti-rotation tabs that can be bent against heads of fasteners inserted into the four holes of the washer, case, and strut to help reduce the likelihood that the fasteners will rotate relative washer. Because the washer is connected to four fasteners, the four fasteners prevent the washer from rotating relative the inner case. The inner case, therefore, does not require any slots or grooves to be formed in the inner surface of the inner case to accommodate anti-rotation features used on prior art mid turbine frame assemblies. The washer can also include at least two reference tabs that function to mistake-proof the washer against improper installation on the inner surface of the inner case.

FIG. 1 is a partial sectional schematic view of gas turbine engine 10. In the illustrated embodiment, gas turbine engine 10 is a turbofan gas turbine engine circumferentially disposed about a central, longitudinal axis or axial engine centerline axis CA as illustrated in FIG. 1. Although the disclosed non-limiting embodiment of gas turbine engine 10 depicts a turbofan gas turbine engine, it should be understood that the concepts described herein are not limited to use with turbofans as the teachings may be applied to other types of turbine engines; for example an industrial power turbine. Gas turbine engine 10 includes in series order from front to rear, low pressure compressor section 12, high pressure compressor section 14, combustor section 16, high pressure turbine section 18, mid turbine frame 20, and low pressure turbine section 22. Gas turbine engine 10 also includes low pressure rotor shaft 24 and high pressure rotor shaft 26. Low pressure rotor shaft 24 rotationally connects low pressure turbine section 22 with low pressure compressor section 12, and high pressure rotor shaft 26 rotationally connects high pressure turbine section 18 with high pressure compressor section 14. As shown in FIG. 1, gas turbine engine 10 can also include bearing assemblies 28 to support low pressure rotor shaft 24 and high pressure rotor shaft 26.

As is well known in the art of gas turbines, incoming ambient air $F_1$ becomes pressurized air $F_2$ in the low and high pressure compressors 12 and 14. Fuel mixes with pressurized air $F_2$ in combustor section 16, where it is burned. Once burned, combustion gases $F_3$ expand through high and low pressure turbine sections 18 and 22 and mid turbine frame 20. High and low pressure turbine sections 18 and 22 drive high and low pressure rotor shafts 26 and 24 respectively, which rotate in response to the combustion products and thus rotate the attached high and low pressure compressor sections 14 and 12.

Mid turbine frame 20 is arranged generally between high pressure turbine section 18 and low pressure turbine section 22. Mid turbine frame 20 supports bearing systems 38 in high pressure turbine section 18 and low pressure turbine section 22 as well as conditioning the flow of combustion gases $F_3$ entering low pressure turbine section 22 from high pressure turbine section 18. Mid turbine frame 20 is discussed in greater detail below with reference to FIG. 2.

Figure 2:
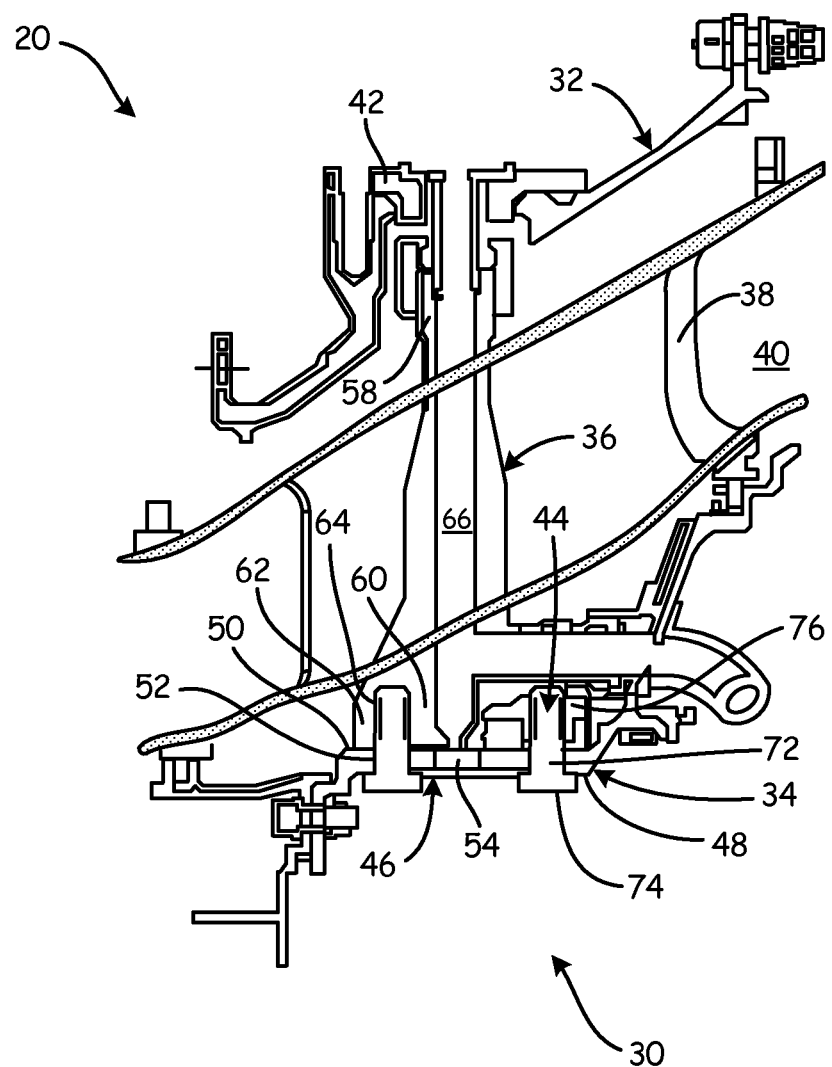
FIG. 2 is a sectional view of a mid turbine frame compatible with the gas turbine engine of FIG. 1.

FIG. 2 is a cross-sectional view of mid turbine frame 20 disposed around bearing compartment 30 that houses one of bearing assemblies 28. As shown in FIG. 2, mid turbine frame 20 can include annular outer case 32, annular inner case 34, struts 36 (only one of which is shown in FIG. 2), shroud 38, and flow passage 40. At each of struts 36, mid turbine frame 20 can also include outer fastener 42, four inner fasteners 44 (only two of which are shown in FIG. 2), and washer 46. Inner case 34 can include inner surface 48 and outer surface 50. At each of struts 36, inner case 34 can also include four case holes 52 (only two of which are shown in FIG. 2), and cooling air inlet 54. Each of struts 36 can include first end 58, second end 60, foot 62 with four foot holes 64 (only two of which are shown in FIG. 2), and cooling air passage 66. Each of fasteners 44 can include bolt 72 with head 74, and nut 76.

Both inner case 34 and outer case 32 can be annular. Inner case 34 is disposed radially within annular outer case 32. Struts 36, can extend radially between outer case 32 and inner case 34 and can radially space outer case 32 from inner case 34 so as to form annular flow passage 40 between inner case 34 and outer case 32. Only one of struts 36 is shown in FIG. 2, however, the description of strut 36 shown in FIG. 2 can be applied to all of struts 36 of mid turbine frame 20. First end 58 of strut 36 is connected to outer case 32 by outer fastener 42. Second end 60 of strut 36 is disposed both opposite first end 58 of strut 36 and proximate inner case 34. Second end 60 of strut 36 can form foot 62. Foot 62 can enlarge second end 60 of strut 36 in a forward-aft direction and in a circumferential direction so as to provide sufficient space on foot 62 to accommodate four radially oriented foot holes 64. Foot holes 64 are configured for attaching foot 62 and first end 58 of strut 36 to outer surface 50 of inner case 34. Foot 62 of strut 36 can be curved so as to conform to outer surface 50 of inner case 34, or a portion of outer surface 50 of inner case 34 can be flattened so as to allow foot 62 to abut flush with outer surface 50 of inner case 34.

The four case holes 52 (only two of which are shown in FIG. 2) extend from inner surface 48 of inner case 34 to outer surface 50 of inner case 34 and can be positioned on inner case 34 so as to meet up with the four foot holes 64 of strut 36. One of bolts 72 can be inserted into each of case holes 52 and foot holes 64 so that heads 74 of bolts 72 are disposed on inner surface 48 of inner case 34, and threaded ends of bolts 72 extend through inner case 34 and foot 62. Nuts 76 can be connected to the threaded ends of bolts 72 so as to connect foot 62 and second end 60 of strut 36 to outer surface 50 of inner case 34. Shroud 38 can be disposed in flow passage 40 and can at least partially cover strut 36, outer surface 50 of inner case 34, and an inner surface of outer case 32 so as to protect strut 36, inner case 34, and outer case 32 from the corrosive heat of combustion gases $F_3$ passing through flow passage 40.

Cooling air passage 66 can be formed inside strut 36 and can extend from first end 58 of strut 36 to second end 60 of strut 36 to allow cooling air to be directed from outer case 32, through strut 36, and towards inner case 34. At second end 60 of strut 36, cooling air passage 66 can branch such that a first portion of cooling air passage 66 moves aft through foot 62 toward low pressure turbine section 22 (shown in FIG. 1), and a second portion of cooling air passage 66 continues radially inward through foot 62. Cooling air inlet 54 can be a hole that extends from outer surface 50 of inner case 34 to inner surface 48 of inner case 34 and can be aligned with the second portion of cooling air passage 66 such that a portion of the cooling air traveling in cooling air passage 66 can enter bearing compartment 30 via cooling air inlet 54 to cool bearing assemblies 28. Cooling air inlet 54 of inner case 34 can be larger in diameter than cooling air passage 66 at second end 60 of strut 36 so as to ensure that inner case 34 does not obstruct cooling air passage 66.

Washer 46 is disposed on inner surface 48 of inner case 34 opposite foot 62 of strut 36. Washer 46 is disposed between heads 74 of bolts 72 and inner surface 48 of inner case 34. Washer 46 can be formed from a nickel metal allow, or any other metal that is resistant to corrosion in the high temperature environment of mid turbine frame 20. As discussed below with reference to FIGS. 3 and 4, washer 46 can be configured to provide anti-rotation of bolts 72 without compromising the structural integrity and service life of inner case 34.

Figure 3:
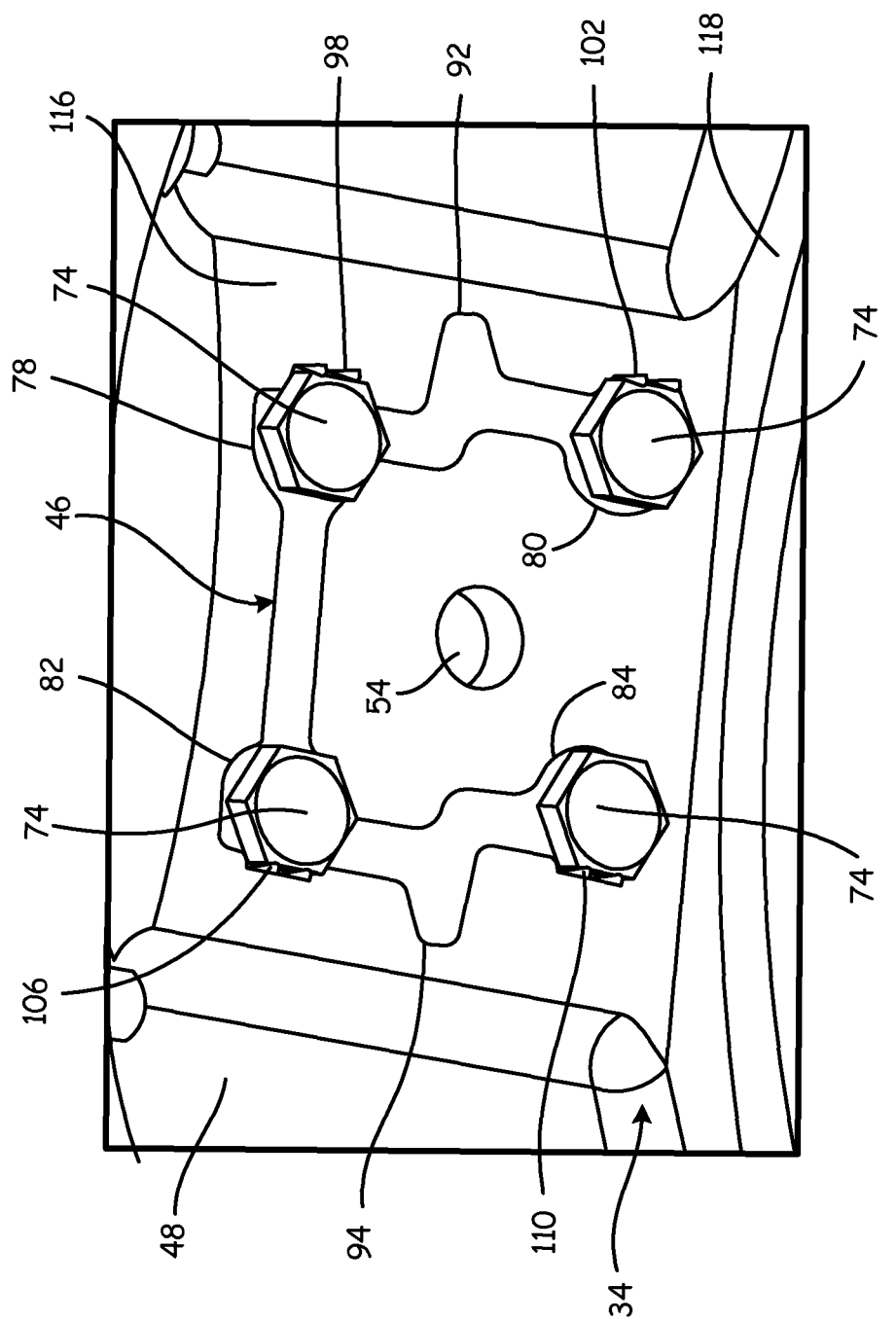
FIG. 3 is a perspective view of the mid turbine frame of FIG. 2.
Figure 4:
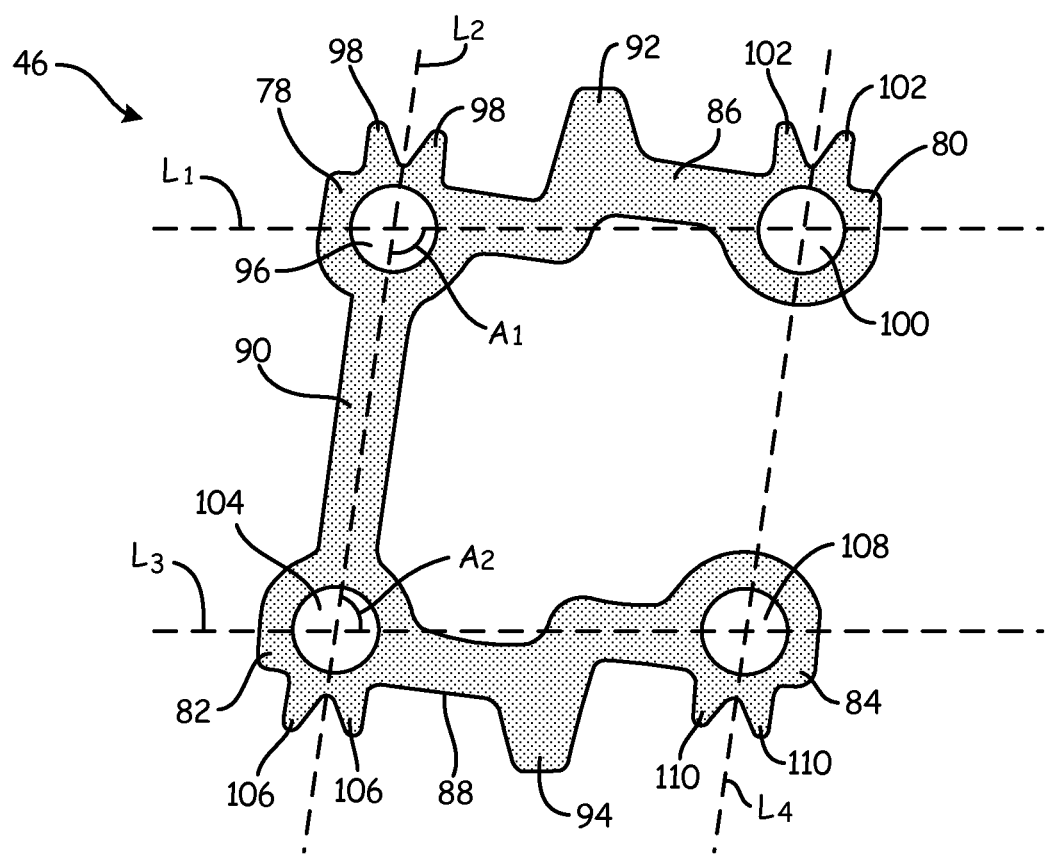
FIG. 4 is an elevation view of a washer from the mid turbine frame of FIG. 3.

FIGS. 3-5 will be discussed concurrently. FIG. 3 is a perspective view of mid turbine frame 20 of FIG. 2, and FIG. 4 is an elevation view of washer 46 from mid turbine frame 20 of FIG. 3. FIG. 5 is a perspective view of washer 46 of FIG. 3. As shown in FIGS. 3-5, washer 46 can include the following elements and features: first guideline $L_1$, second guideline $L_2$, third guideline $L_3$, fourth guideline $L_4$, first angle $A_1$, second angle $A_2$, first lobe 78, second lobe 80, third lobe 82, fourth lobe 84, first leg 86, second leg 88, third leg 90, first reference tab 92, and second reference tab 94. First lobe 78 can include first hole 96 and anti-rotation tabs 98. Second lobe 80 can include second hole 100 and anti-rotation tabs 102. Third lobe 82 can include third hole 104 and anti-rotation tabs 106. Fourth lobe 84 can include fourth hole 108 and anti-rotation tabs 110. First leg 86 can include first bend 112, and second leg 86 can include second bend 114. As shown in FIG. 3, inner case 34 can further include platform 116 and forward wall 118.

Washer 46 can be generally shaped as parallelogram, as shown by first guideline $L_1$, second guideline $L_2$, third guideline $L_3$, and fourth guideline $L_4$. First guideline $L_1$ of washer 46 can be parallel to third guideline $L_3$ of washer 46. Second guideline $L_2$ of washer 46 can be parallel to fourth guideline $L_4$ of washer 46. Second guideline $L_2$ and fourth guideline $L_4$ can both intersect first guideline $L_1$ and third guideline $L_3$ such that first guideline $L_1$ and second guideline $L_2$ can form first angle $A_1$, and second guideline $L_2$ and third guideline $L_3$ can form second angle $A_2$. As shown in FIG. 4, first angle $A_1$ can be greater than 90 degrees and second angle $A_2$ can be less than 90 degrees. First lobe 78 of washer 47 can be positioned on the intersection of first guideline $L_1$ and second guideline $L_2$. Second lobe 80 can be positioned on the intersection of first guideline $L_1$ and fourth guideline $L_4$. Third lobe 82 can be positioned on the intersection of third guideline $L_3$ and second guideline $L_2$. Fourth lobe 84 can be positioned on the intersection of the third guideline $L_3$ and the fourth guideline $L_4$. First leg 86 can extend generally from first lobe 78 to second lobe 80 along first guideline $L_1$. Second leg 88 can extend generally from third lobe 82 to fourth lobe 84 along third guideline $L_3$. As shown in FIGS. 3-5, second leg 88 can be parallel to first leg 86. Third leg 90 can extending from first lobe 78 to third lobe 82 and can space first leg 86 from second leg 88 such that second lobe 80 is disposed opposite fourth lobe 84. First lobe 78, second lobe 80, third lobe 82, fourth lobe 84, first leg 86, second leg 88, and third leg 90 of washer 46 can all be coplanar with one another. Each of lobes 78, 80, 82, and 84 can include a D-shaped profile. First hole 96 is formed in first lobe 78 and second hole 100 is formed in second lobe 80. Third hole 104 is formed in third lobe 82 and fourth hole 108 is formed in fourth lobe 84. First hole 96 can be centered on the intersection of first guideline $L_1$ and second guideline $L_2$. Second hole 100 can be centered on the intersection of first guideline $L_1$ and fourth guideline $L_4$. Third hole 104 can be centered on the intersection of third guideline $L_3$ and second guideline $L_2$. Fourth hole 108 can be centered on the intersection of third guideline $L_3$ and fourth guideline $L_4$. First leg 86 can include first bend 112 and second leg 88 can include second bend 114. Bends 112 and 114 in legs 86 and 88 can aid legs 86 and 88 in positioning holes 96, 100, 104, and 108 relative one another.

Tabs 98 of first lobe 78, which can be two in number as shown in FIGS. 3-5, can extend generally from first lobe 78 along second guideline L2 and opposite third lobe 82 and third leg 90. Tabs 102 of second lobe 80, which can also be two in number as shown in FIGS. 3-5, can extend generally from second lobe 80 along fourth guideline L4 and opposite fourth lobe 84. Tabs 106 of third lobe 82, which can also be two in number, can extend generally from third lobe 82 along second guideline L2 and opposite first lobe 78 and third leg 90. Tabs 110 of fourth lobe 84, which can also be two in number, can extend generally from fourth lobe 84 along fourth guideline L4 and opposite second lobe 80. Tabs 98 of first lobe 78, tabs 102 of second lobe 80, tabs 106 of third lobe 82, and tabs 110 of fourth lobe 84 can all be configured to be bent out of plane with the rest of washer 46 and against heads 74 of the respective bolts 72 disposed in first hole 96, second hole 100, third hole 104, and fourth hole 108 of washer 46. As shown in FIG. 5, Tabs 98, 102, 106, and 110 can all be pre-bent relative lobes 78, 80, 82, and 84 respectively so that tabs 98, 102, 106, and 110 are at least partially elevated off inner surface 48 of inner case 34 before 98, 102, 106, and 110 are bent against heads 74 of bolts 72.

Partially elevating tabs 98, 102, 106, and 110 off inner surface 48 of inner case 34 allows an operator easier access to tabs 98, 102, 106, and 110 to bend tabs 98, 102, 106, and 110 against heads 74 of bolts 72, thereby reducing the likelihood that the operator will gouge or damage inner surface 48 of inner case 34 during assembly of mid turbine frame 20.

Flat platform 104 can be formed on inner surface 48 of inner case 34 so as to provide a flat surface on inner case 34 for mounting washer 46. Inner case 34 can also include forward wall 118. Forward wall 110 can be an annular wall disposed forward of flat platform 104 and that can extend radially inward from inner surface 48 of inner case 34. Forward wall 110 can be used as a mounting flange for connecting inner case 34 to high pressure turbine section 18 (shown in FIG. 1).

First reference tab 92 can extend from first leg 86 between first lobe 78 and second lobe 80, and in the same direction as tabs 98 of first lobe 78 and tabs 102 of second lobe 82. Second reference tab 94 can extend from second leg 88 between third lobe 82 and fourth lobe 84, and in the same direction as tabs 106 of third lobe 82 and tabs 110 of fourth lobe 84. First reference tab 92 and second reference tab 94 can both be longer than tabs 98, 102, 106, and 110 of lobes 78, 80, 82, and 84. The function of reference tabs 92 and 94 is discussed below with reference to FIGS. 6A-7C.

FIGS. 6C-7C will be discussed concurrently. Both FIGS. 6A and 6B are elevation views of washer 46 from FIGS. 3-5 orientated one of two correct positions for installation on inner surface 48 of inner case 34. When mid turbine 20 is assembled properly, as shown in FIGS. 6A and 6B (and in FIG. 3), each of first hole 96, second hole 100, third hole 104, and fourth hole 108 of washer 46 is concentric with one of the four foot holes 64 and one of the four case holes 52 so as to receive one of bolts 72 respectively. Washer 46 shown in FIGS. 6A and 6B is also in a correct position because first lobe 78, second lobe 80, third lobe 82, and fourth lobe 84 of washer 46 are flush against inner surface 48 of inner case 34, while all of tabs 98, 102, 106, and 110 of washer 46 are at least partially elevated off inner surface 48 of inner case 34. With washer 46 installed on inner case 34, cooling air inlet 54 of inner case 34 is disposed between first leg 86 and second leg 88 of washer 46 and is thus uninhibited by the presence of washer 46 on inner surface 48 of inner case 34. As shown in FIGS. 6A and 6B, first leg 86 and second leg 88 of washer 46 extend primarily in a forward-aft direction of mid turbine frame 20 when washer 46 is correctly installed on inner surface 48 of inner case 34. The forward-aft direction of mid turbine frame 20 is generally parallel to engine centerline axis CA shown in FIG. 1.

After bolts 72 have been installed in first hole 96, second hole 100, third hole 104, and fourth hole 108 of washer 46, and after foot 62 of strut 36 is connected to inner case 34, tabs 98, 102, 106, and 110 of washer 46 can be bent away from inner case 34 and against heads 74 of bolts 72 to prevent bolts 72 from turning and loosening relative washer 46 during operation of gas turbine engine 10 (shown in FIG. 1). Because washer 46 is connected to more than one of bolts 72, washer 46 is also unable to turn or move relative inner case 34 and loosen bolts 72 during operation of gas turbine engine 10.

Figure 7A:
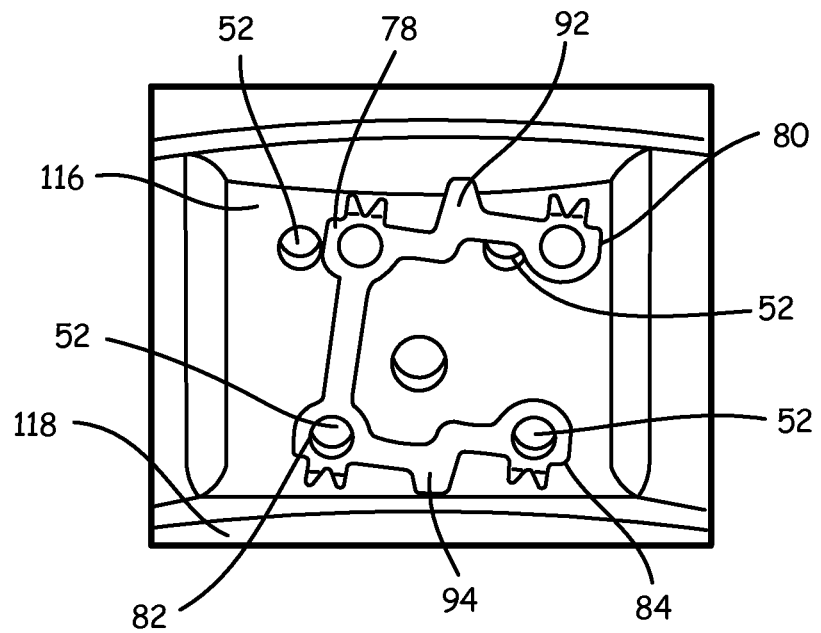
FIG. 7A is an elevation view of the washer from FIG. 5 orientated in an incorrect position for installation.
Figure 7B:
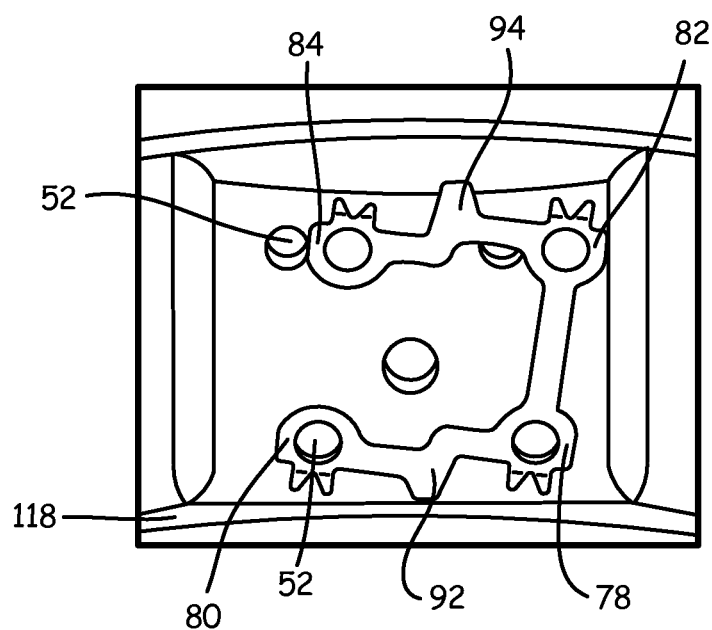
FIG. 7B is an elevation view of the washer from FIG. 5 orientated in another incorrect position for installation.
Figure 7C:
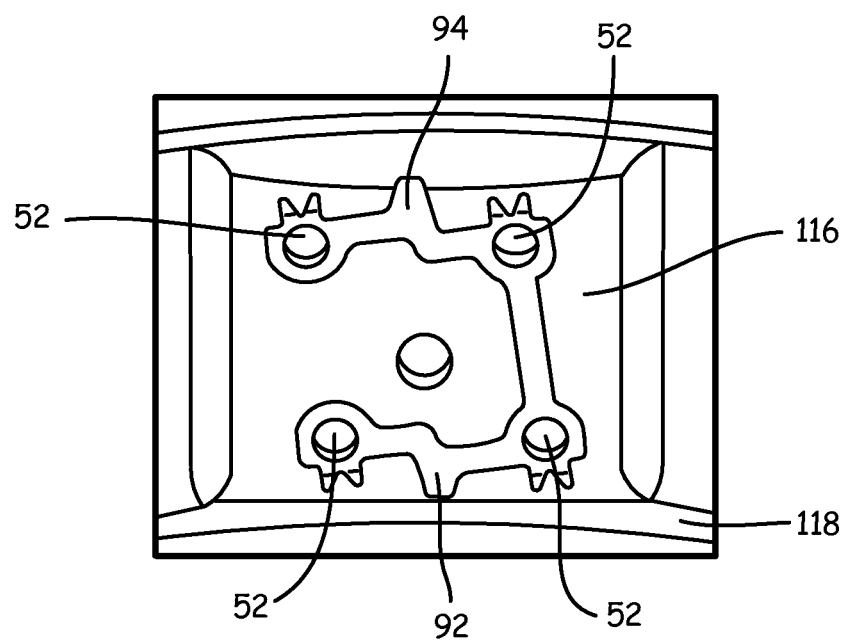
FIG. 7C is an elevation view of the washer from FIG. 5 orientated in another incorrect position for installation.

FIGS. 7A-7C are elevation views of washer 46 in incorrect orientations for installation on inner case 34. As shown in FIG. 7A, should washer 46 be rotated counter-clockwise from the correct orientation shown in FIG. 6A, second reference tab 94 comes into contact with forward wall 118. In this orientation, second reference tab 94 must be bent or shortened to enable third lobe 82 and fourth lobe 84 to be positioned over case holes 52. Even with second reference tab 94 bent or shortened to allow third lobe 82 and fourth lobe 84 to be positioned over case holes 52, first lobe 78 and second lobe 80 are still not positioned over case holes 52 sufficient to install bolts 72.

Rotating washer 46 clockwise from the correct orientation shown in FIG. 6A, as shown in FIG. 7B, also does not allow for installation of washer 46 on inner case 34 because first reference tab 92 comes into contact with forward wall 118 and creates the same issues described with reference to FIG. 7A.

FIG. 7C illustrates that left-to-right flipping of the orientation of washer 46 from FIG. 7B also does not allow for installation of washer 46 onto inner case 34 for two reasons. First, lobes 78, 80, 82, and 84 of washer 46 can only be positioned over case holes 52 by bending or shortening reference tab 94. Second, the orientation of FIG. 7C does not allow first lobe 78, second lobe 80, third lobe 82, and fourth lobe 84 of washer 46 to sit flush against inner surface 48 of inner case 34 due to the pre-bent in tabs 98, 102, 106, and 110 lifting washer 46 off inner surface 48 of inner case 34. By only allowing washer 46 to be connected to inner case 34 when in the correct and intended orientations shown in FIGS. 6A and 6B, for installing washer 46, first reference tab 92 and second reference tab 94 function mistake proofing features to ensure that washer 46 is correctly installed on inner case 34. Incorrect installation of washer 46 on inner case 34 can result in improper preloading of strut 36 on inner case 34, which can lead to a shortened service life of mid turbine frame 20.

In view of the foregoing description, it will be recognized that the present disclosure provides numerous advantages and benefits. For example, washer 46 provides anti-rotation of bolts 72 without requiring the addition of any slots or grooves in inner surface 48 of inner case 34 of mid turbine frame 20. Adding grooves and slots to inner case 34, such as in the case of prior art mid turbine frame assemblies, can cause stress risers to form in inner case 34. Because inner case 34 does not include any slots or grooves to accommodate the anti-rotation functions of washer 46, inner case 34 and mid turbine frame 20 can have a longer service life than prior art mid turbine frame assemblies. Furthermore, washer 46 can include reference tabs 92 and 94, which only allow for correct installation orientations of washer 46. Because reference tabs 92 and 94 do not allow for incorrect installation orientations of washer 46 on inner case 34, washer 46 is mistake proof against improper installation.

The following are non-exclusive descriptions of possible embodiments of the present invention.

In one embodiment, a washer includes a first lobe comprising a first hole, a second lobe comprising a second hole, a third lobe comprising a third hole, and a fourth lobe comprising a fourth hole. A first leg extends from the first lobe to the second lobe, and a second leg extends between the third lobe and the fourth lobe, wherein the second leg is parallel to the first leg. A third leg extends from the first lobe to the third lobe and spaces the first leg from the second leg such that the second lobe is disposed opposite the fourth lobe.

The washer of the preceding paragraph can optionally include, additionally and/or alternatively, any one or more of the following features, configurations and/or additional components:

the first lobe comprises at least two tabs extending from the first lobe opposite the third leg;

the second lobe comprises: at least two tabs extending from the second lobe in a same direction as the at least two tabs of the first lobe;

the third lobe comprises at least two tabs extending from the third lobe opposite the third leg;

the fourth lobe comprises at least two tabs extending from the fourth lobe in a same direction as the at least two tabs of the third lobe;

a first straight line extending from a center of the second hole to a center of the first hole forms an angle greater than 90 degrees with a second straight line extending from the center of the first hole to a center of the third hole;

a third straight line extending from a center of the fourth hole to a center of the third hole forms an angle less than 90 degrees with the second straight line;

a first reference tab extending from the first leg between the first lobe and the second lobe;

the first reference tab is longer than both the at least two tabs of the first lobe and the at least two tabs of the second lobe;

a second reference tab extending from the second leg between the third lobe and the fourth lobe; and/or the second reference tab is longer than both the at least two tabs of the third lobe and the at least two tabs of the fourth lobe.

In another embodiment, a mid turbine frame includes an outer case, an inner case disposed radially within the outer case, and a strut extending radially between the outer case and the inner case. The strut includes a first end connected to the outer case and a second end forming a foot disposed against an outer surface of the inner case. The mid turbine frame further includes a washer disposed on an inner surface of the inner case opposite the foot of the strut. The washer includes a first lobe comprising a first hole and a second lobe comprising a second hole. The washer further includes a leg extending from the first lobe to the second lobe. At least two tabs extend from the first lobe and at least two tabs extend from the second lobe in a same direction as the at least two tabs of the first lobe. A reference tab extends from the first leg between the first lobe and the second lobe and in the same direction as the at least two tabs of the first lobe.

The mid turbine frame of the preceding paragraph can optionally include, additionally and/or alternatively, any one or more of the following features, configurations and/or additional components:

the washer further comprises: a third lobe comprising a third hole; a fourth lobe comprising a fourth hole; a second leg extending between the third lobe and the fourth lobe, wherein the second leg is parallel to the first leg; and a third leg extending from the second lobe to the third lobe and spacing the first leg from the second leg;

the washer further comprises: at least two tabs extending from the third lobe; at least two tabs extending from the fourth lobe in a same direction as the at least two tabs of the third lobe; and a second reference tab extending from the second leg between the third lobe and the fourth lobe and in the same direction as the at least two tabs of the third lobe;

the foot of the strut comprises: a first foot hole concentric with the first hole of the first lobe of the washer; a second foot hole concentric with the second hole of the second lobe of the washer; a third foot hole concentric with the third hole of the third lobe of the washer; and a fourth foot hole concentric with the fourth hole of the fourth lobe of the washer;

the inner case comprises: a first case hole concentric with both the first hole of the first lobe of the washer and the first foot hole of the foot of the strut; a second case hole concentric with both the second hole of the second lobe of the washer and the second foot hole of the foot of the strut; a third case hole concentric with both the third hole of the third lobe of the washer and the third foot hole of the foot of the strut; and a fourth case hole concentric with both the fourth hole of the fourth lobe of the washer and the fourth foot hole of the foot of the strut;

a first fastener disposed in the first case hole, the first hole of the washer, and the first foot hole of the foot of the strut; a second fastener disposed in the second case hole, the second hole of the washer, and the second foot hole of the foot of the strut; a third fastener disposed in the third case hole, the third hole of the washer, and the third foot hole of the foot of the strut; and a fourth fastener disposed in the fourth case hole, the fourth hole of the washer, and the fourth foot hole of the foot of the strut;

the strut further comprises: a cooling air passage formed inside the strut and that extends from the first end of the strut to the second end of the strut;

the inner case comprises: a cooling air inlet that extends from the outer surface of the inner case to the inner surface of the inner case, wherein the cooling air inlet is in fluidic communication with the cooling air passage of the strut, and wherein the cooling air inlet is disposed between the first leg and the second leg of the washer; and/or the first leg and the second leg of the washer extend primarily in a forward-aft direction of the mid turbine frame.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2-3 show fasteners 44 as bolts 72 and nuts 76, fasteners 44 can include any fastener capable of connecting foot 62 of strut 36 and washer 46 to inner case 34. In addition, many modifications may be made to adapt a particular situation or material to the teachings of the invention without departing from the essential scope thereof. For example, while washer 46 has been described with reference to use in mid turbine frame 20, washer 46 can also be used in intermediate frames for compressor sections of a gas turbine engine. Therefore, it is intended that the invention not be limited to the particular embodiment(s) disclosed, but that the invention will include all embodiments falling within the scope of the appended claims.

The invention claimed is:

1. A washer comprising:
   a first lobe comprising a first hole;
   a second lobe comprising a second hole;
   a third lobe comprising a third hole;
   a fourth lobe comprising a fourth hole;
   a first leg extending from the first lobe to the second lobe;
   a second leg extending between the third lobe and the fourth lobe, wherein the second leg is parallel to the first leg;
   a third leg extending from the first lobe to the third lobe and spacing the first leg from the second leg such that the second lobe is disposed opposite the fourth lobe; and
   a first reference tab extending from the first leg between the first lobe and the second lobe and in the same direction as the at least two tabs of the first lobe, and wherein the first reference tab is longer than both the at least two tabs of the first lobe and the at least two tabs of the second lobe.

2. The washer of claim 1, wherein the first lobe comprises:
   at least two tabs extending from the first lobe opposite the third leg.

3. The washer of claim 2, wherein the second lobe comprises:
   at least two tabs extending from the second lobe in a same direction as the at least two tabs of the first lobe.

4. The washer of claim 3, wherein the third lobe comprises:
   at least two tabs extending from the third lobe opposite the third leg.

5. The washer of claim 4, wherein the fourth lobe comprises:
   at least two tabs extending from the fourth lobe in a same direction as the at least two tabs of the third lobe.

6. The washer of claim 5, wherein a first straight line extending from a center of the second hole to a center of the first hole forms an angle greater than 90 degrees with a second straight line extending from the center of the first hole to a center of the third hole.

7. The washer of claim 6, wherein a third straight line extending from a center of the fourth hole to a center of the third hole forms an angle less than 90 degrees with the second straight line.

8. The washer of claim 5 further comprising:
   a second reference tab extending from the second leg between the third lobe and the fourth lobe.

9. The washer of claim 8, wherein the second reference tab is longer than both the at least two tabs of the third lobe and the at least two tabs of the fourth lobe.

10. A mid turbine frame comprising:
    an outer case;
    an inner case disposed radially within the outer case;
    a strut extending radially between the outer case and the inner case, wherein the strut comprises:
       a first end connected to the outer case; and
       a second end forming a foot disposed against an outer surface of the inner case;
    a washer disposed on an inner surface of the inner case opposite the foot of the strut, wherein the washer comprises:
       a first lobe comprising a first hole;
       a second lobe comprising a second hole;
       a leg extending from the first lobe to the second lobe;
       at least two tabs extending from the first lobe;
       at least two tabs extending from the second lobe in a same direction as the at least two tabs of the first lobe; and
       a reference tab extending from the first leg between the first lobe and the second lobe and in the same direction as the at least two tabs of the first lobe, and wherein the reference tab is longer than both the at least two tabs of the first lobe and the at least two tabs of the second lobe.

11. The mid turbine frame of claim 10, wherein the washer further comprises:
a third lobe comprising a third hole;
a fourth lobe comprising a fourth hole;
a second leg extending between the third lobe and the fourth lobe, wherein the second leg is parallel to the first leg; and
a third leg extending from the second lobe to the third lobe and spacing the first leg from the second leg.

12. The mid turbine frame of claim 11, wherein the washer further comprises:
at least two tabs extending from the third lobe;
at least two tabs extending from the fourth lobe in a same direction as the at least two tabs of the third lobe; and
a second reference tab extending from the second leg between the third lobe and the fourth lobe and in the same direction as the at least two tabs of the third lobe.

13. The mid turbine frame of claim 12, wherein the foot of the strut comprises:
a first foot hole concentric with the first hole of the first lobe of the washer;
a second foot hole concentric with the second hole of the second lobe of the washer;
a third foot hole concentric with the third hole of the third lobe of the washer; and
a fourth foot hole concentric with the fourth hole of the fourth lobe of the washer.

14. The mid turbine frame of claim 13, wherein the inner case comprises:
a first case hole concentric with both the first hole of the first lobe of the washer and the first foot hole of the foot of the strut;
a second case hole concentric with both the second hole of the second lobe of the washer and the second foot hole of the foot of the strut;
a third case hole concentric with both the third hole of the third lobe of the washer and the third foot hole of the foot of the strut; and
a fourth case hole concentric with both the fourth hole of the fourth lobe of the washer and the fourth foot hole of the foot of the strut.

15. The mid turbine frame of claim 14 further comprising:
a first fastener disposed in the first case hole, the first hole of the washer, and the first foot hole of the foot of the strut;
a second fastener disposed in the second case hole, the second hole of the washer, and the second foot hole of the foot of the strut;
a third fastener disposed in the third case hole, the third hole of the washer, and the third foot hole of the foot of the strut; and
a fourth fastener disposed in the fourth case hole, the fourth hole of the washer, and the fourth foot hole of the foot of the strut.

16. The mid turbine frame of claim 15, wherein the strut further comprises:
a cooling air passage formed inside the strut and that extends from the first end of the strut to the second end of the strut.

17. The mid turbine frame of claim 16, wherein the inner case comprises:
a cooling air inlet that extends from the outer surface of the inner case to the inner surface of the inner case,
wherein the cooling air inlet is in fluidic communication with the cooling air passage of the strut, and
wherein the cooling air inlet is disposed between the first leg and the second leg of the washer.

18. The mid turbine frame of claim 17, wherein the first leg and the second leg of the washer extend primarily in a forward-aft direction of the mid turbine frame.

* * * * *